United States Patent
Tsuruya

(10) Patent No.: US 7,129,966 B2
(45) Date of Patent: Oct. 31, 2006

(54) MULTI-BEAM IMAGE FORMING APPARATUS WITH OVERLAPPED SCANNING

(75) Inventor: Takaaki Tsuruya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 10/754,530

(22) Filed: Jan. 12, 2004

(65) Prior Publication Data

US 2004/0141051 A1    Jul. 22, 2004

(30) Foreign Application Priority Data

Jan. 20, 2003    (JP)    ............................. 2003-011220

(51) Int. Cl.
*B41J 2/47*    (2006.01)

(52) U.S. Cl. ...................................... 347/239

(58) Field of Classification Search ........ 347/232–235, 347/248–250, 238–240, 251–255; 250/234; 358/1.9, 1.2–1.7; 382/299

See application file for complete search history.

(56) References Cited

U.S. PATENT DOCUMENTS

| | | | |
|---|---|---|---|
| 5,887,124 A * | 3/1999 | Iwasaki et al. | ............... 358/1.9 |
| 5,991,567 A | 11/1999 | Kobayashi et al. | ......... 399/101 |
| 6,504,147 B1 * | 1/2003 | Ito et al. | ..................... 250/234 |

* cited by examiner

*Primary Examiner*—Hai Pham
(74) *Attorney, Agent, or Firm*—Fitzpatrick, Cella, Harper & Scinto

(57) ABSTRACT

In an image forming apparatus, resolution in a main scanning direction and in a sub-scanning direction is increased utilizing features of a multibeam system. The same scanning line is subjected to duplicate scanning by two light beams from two lasers. At that time, dot strings having a dot interval of d formed by the respective light beams are shifted by d/2 in the main scanning direction.

4 Claims, 8 Drawing Sheets

MULTI-BEAM IMAGE FORMING APPARATUS WITH OVERLAPPED SCANNING

BACKGROUND OF THE INVENTION

1. Field of the Invention

The present invention relates to a multibeam image forming apparatus. More particularly, the invention relates to realization of high resolution of an image formed by the apparatus.

2. Description of the Related Art

In image forming apparatuses for forming an electrostatic latent image using a laser beam, such as digital copiers, laser-beam printers, and the like, a laser beam from a semiconductor laser is projected onto a rotating polygonal mirror, and a reflected beam from the polygonal mirror is projected onto the surface of a charged photosensitive member moving at a constant speed. By the rotation of the polygonal mirror, the laser beam is caused to perform scanning in a direction (main scanning direction) orthogonal to the moving direction (sub-scanning direction) of the photosensitive member. Since the laser beam is modulated in accordance with an image to be output, an electrostatic latent image is formed on the photosensitive member. The electrostatic latent image is developed to provide a visualized toner image.

Recently, in response to a request for high-speed image formation, multibeam image forming apparatuses having a plurality of lasers have been realized.

In such a multibeam image forming apparatus, lasers are disposed so as to perform scanning by arranging a plurality of laser beams in a sub-scanning direction. For example, a forced-laser-emission signal and a sample-and-hold request signal are prepared for each laser, and start of control to cause each laser to emit light by the forced-laser-emission signal and the sample-and-hold request signal at a predetermined timing, and to adjust the amount of laser light to a predetermined value (automatic power control) is instructed in a non-image region for each scanning operation during a printing operation. An image for a plurality of lines is formed at one laser scanning operation. Accordingly, in a printer of this type, an image for the same number of lines as the number of laser beams can be formed at one laser scanning operation. As a result, high-speed printing can be realized.

On the other hand, in order to respond to a request for high-resolution image formation, the number of image forming apparatuses having a high-resolution mode in addition to an ordinary-resolution mode is increasing (refer to Patent Literatures 1, 2).

When intending to provide high resolution in a main scanning direction, an approach to increase the frequency of video clock signals for transmitting image data is adopted in order to increase the pixel density at one laser scanning operation.

When intending to provide high resolution in a sub-scanning direction, an approach to increase the rotational speed of the polygonal mirror as well as increasing the frequency of video clock signals, or an approach to reduce the moving speed of the photosensitive member is adopted in order to increase the scanning frequency (the number of scanning operations per unit length in the sub-scanning direction) for the photosensitive member.

However, in a multibeam image forming apparatus, if the scanning frequency for the photosensitive member is increased in order to provide high resolution in the sub-scanning direction, a problem of duplicated scanning arises. For example, in a two-beam image forming apparatus, the scanning frequency for the photosensitive member must be increased by four times in order to double the resolution in the sub-scanning direction. In this case, if the two-beam image forming system is used without being modified, the same scanning line is subjected to duplicated scanning by respective laser beams because the beam interval remains in the state of original resolution (refer to FIG. 4 and related description to be provided below). Accordingly, scanning must be performed only by one of two beams, and therefore the feature of the two-beam image forming system is not utilized.

Furthermore, in order to provide high resolution in the main scanning direction, the frequency of video clock signals may be increased. However, an increase in the frequency causes a problem of radiation noise from circuitry, thereby increasing the production cost in order to deal with radiation noise.

SUMMARY OF THE INVENTION

The present invention has been made in consideration of the above-described problems.

It is an object of the present invention to increase resolution in a main scanning direction and in a sub-scanning direction in an image forming apparatus by utilizing features of a multibeam method.

According to one aspect of the present invention, an image forming apparatus includes n independently driven light sources, a scanner unit adapted to cause n light beams from the n light sources to perform scanning on a photosensitive member in a main scanning direction, a moving unit adapted to cause the n light beams to perform scanning in a sub-scanning direction by moving the photosensitive member, and a control unit for controlling the scanner unit and/or the moving unit so that a main scanning line on the photosensitive member is subjected to overlapped exposure k times with different light beams. The control unit has at least a first mode in which k is set to k1, and a second mode in which k is set to k2 (=k1), wherein n=i1×k1 ≠i2×k2, i1 and i2 are natural numbers, and k1 and k2 are natural numbers equal to or larger than 2. The image forming apparatus also includes a modulator for modulating the respective light beams so that dot strings formed by the respective light beams are shifted by a distance of d/k in the main scanning direction, where d is an interval between dots formed by each light beam.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Image forming apparatuses according to preferred embodiments of the present invention will now be described in detail with reference to the drawings. The present invention is not limited to an apparatus, but can also be applied to a method or to a program for realizing the method, based on the description of the embodiments.

(First Embodiment)

Figure 1:
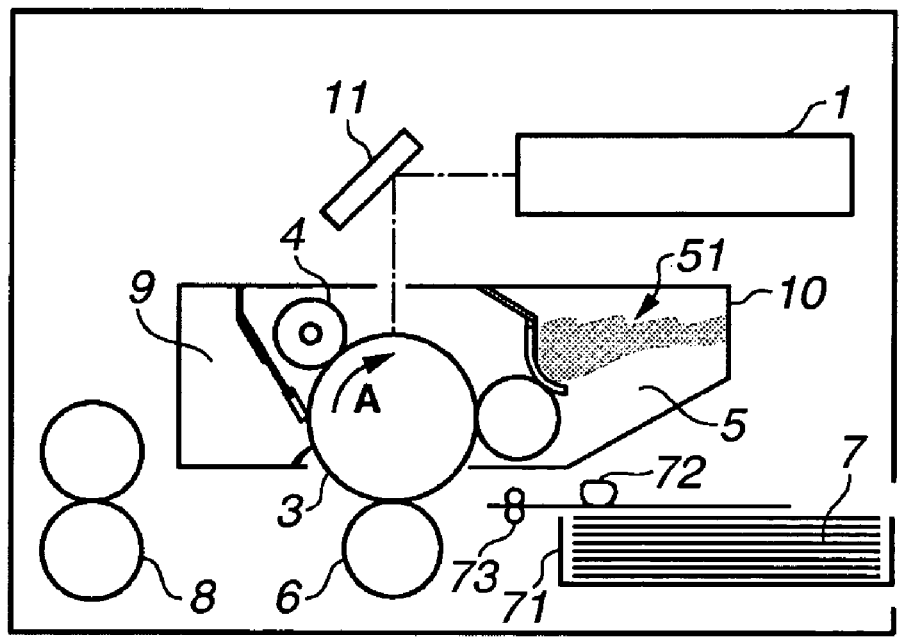
FIG. 1 is a cross-sectional view illustrating the configuration of an image forming apparatus according to a first embodiment of the present invention.

FIG. 1 is a schematic cross-sectional view illustrating the configuration of an image forming apparatus according to a first embodiment of the present invention. In FIG. 1, a scanner unit 1 includes a laser, a polygonal mirror and a lens system, and scans the surface of a photosensitive drum 3 in an axial direction using a laser beam. An electrostatic latent image is formed on the surface of the cylindrical photosensitive drum 3 by projecting the laser beam. A primary charger 4 comprises a charging roller for uniformly charging the surface of the photosensitive drum 3. A toner 51 within a developing device 5 adheres to charged portions of the photosensitive drum 3 by being negatively charged. A transfer charger 6 comprises a transfer roller. A recording material 7 comprises, for example, a transfer material on which a formed image is to be recorded. A fixing unit 8 permanently fixes the toner 51 adhering to the recording material 7. An elastic cleaning blade is used as a cleaning device 9. A reflecting mirror 11 reflects the laser beam so as to be projected onto the photosensitive drum 3.

A cassette 71 is used for mounting sheets of the recording material 7 on which image formation is to be performed. A standard-cassette sheet feeding roller 72 feeds the recording material 7 from the cassette 71. Registration rollers 73 detect the registration of the leading edge of the conveyed recoding material 7 in order to perform printing. The registration rollers 73 convey the recording material 7 in synchronization with the leading edge of the latent image on the photosensitive drum 3.

Figure 2:
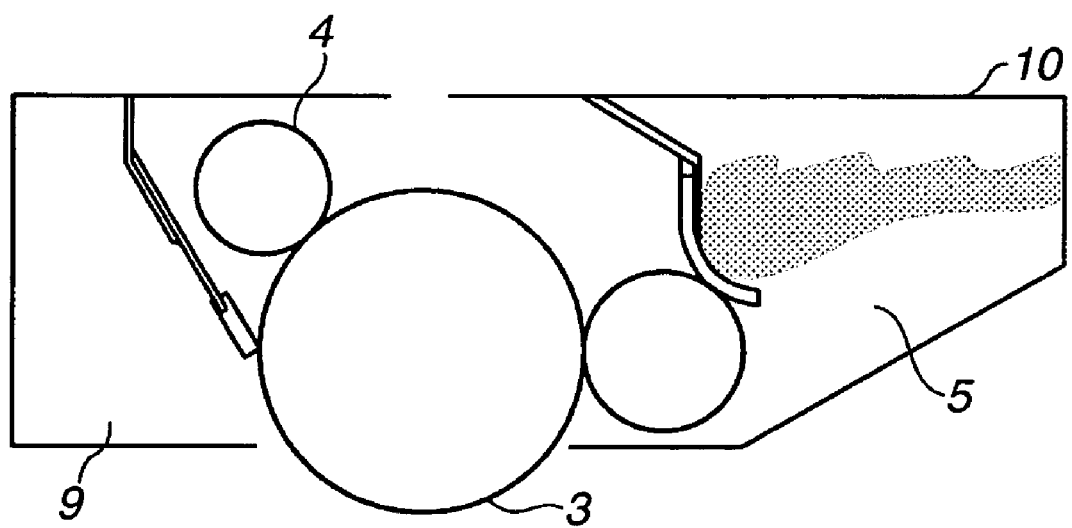
FIG. 2 is a cross-sectional view illustrating the configuration of a process cartridge shown in FIG. 1.

FIG. 2 is a diagram illustrating the configuration of a process cartridge used in the first embodiment. As shown in FIG. 2, the photosensitive drum 3, the charging roller 4, the developing device 5 and the cleaning device 9 that have been described above are integrated as a process cartridge 10. These components are assembled within the process cartridge 10 with a predetermined mutual positional relationship. The process cartridge 10 can be inserted and mounted at a predetermined portion within the main body of the image forming apparatus according to a predetermined procedure, and can also be extracted from the main body of the apparatus. When the image forming apparatus continues to be used for a long time, the printing quality is degraded because the above-described components wear. In such a case, the user may exchange the process cartridge 10, so that a maintenance-free state for the user can be realized.

The operations of the image forming apparatus will now be described. A laser beam modulated in accordance with an image signal is output from the scanner unit 1 so as to perform scanning. The laser beam is reflected by the reflecting mirror 11, and is projected onto the photosensitive drum 3, serving as an electrostatic-latent-image bearing member. The photosensitive drum 3 is uniformly charged by the primary charger 4, and an electrostatic latent image is formed on the surface of the photosensitive drum 3 by irradiation of the laser beam. The electrostatic latent image is visualized as a toner image by being developed by the toner 51 within the developing device 5.

The recording material 7 accommodated within the cassette 71 as the transfer material is fed to the registration rollers 73 by the sheet feeding roller 72. Then, the recording material 7 is conveyed to the transfer charger 6, comprising the transfer roller, by the registration rollers 73 in synchronization with the leading edge of the latent image formed on the photosensitive drum 3, and the toner image is transferred onto the recording material 7 by the transfer charger 6. After the toner image has been permanently fixed by the fixing unit 8, the recording material 7 having the toner image transferred thereto is discharged outside of the apparatus. Toner particles remaining on the photosensitive drum 3 are removed by the cleaning device 9.

Figure 3:
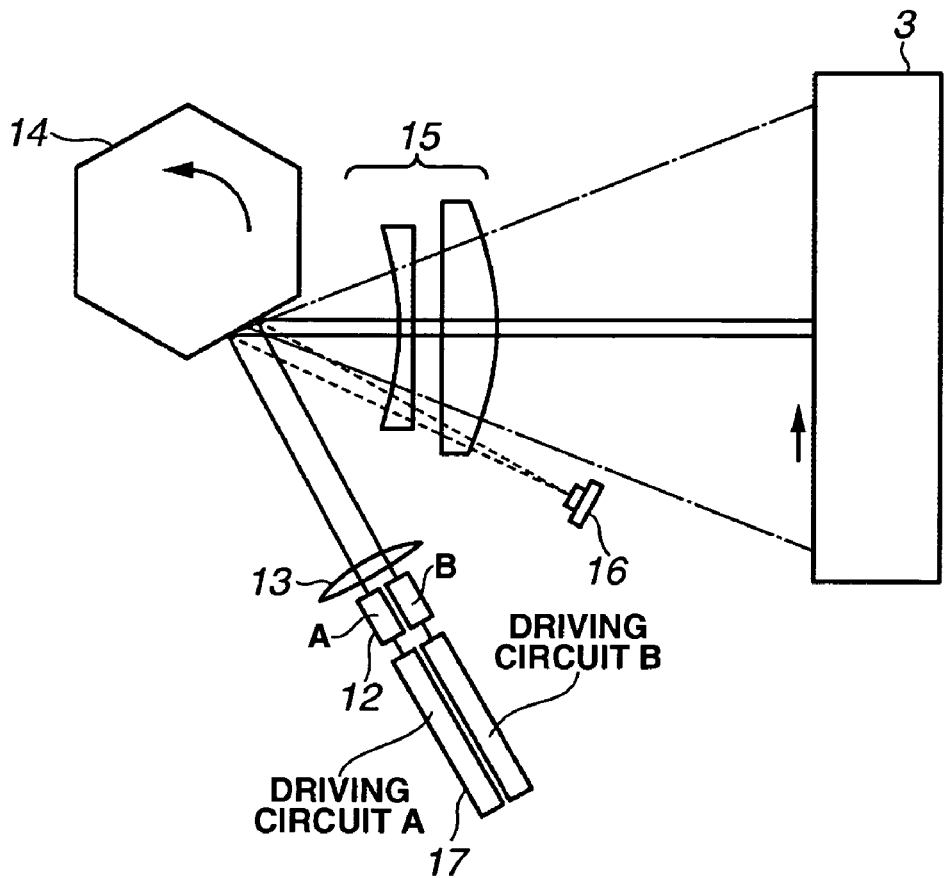
FIG. 3 is a diagram illustrating a scanner unit shown in FIG. 1.

FIG. 3 is a diagram illustrating the configuration of the scanner unit 1 used in the first embodiment. The configuration of the scanner unit 1 having two lasers will now be described with reference to FIG. 3.

Two lasers 12 will be represented as lasers 12A and 12B. The laser beam emitted from each of the lasers 12A and 12B is made a parallel beam having substantially a predetermined beam diameter by a first lens system 13 including a collimating lens, a diaphragm and the like, and is projected onto the polygonal mirror 14. The polygonal mirror 14 rotates at a constant speed in the direction of an arrow. The incident light beam is reflected as a deflecting beam whose angle continuously changes in accordance with the rotation of the polygonal mirror 14. The deflecting light beam is condensed by a second lens system 15, such as an f-θ lens system or the like, and scans the surface of the photosensitive drum 3 in the direction of an arrow at a constant speed.

Driving circuits 17A and 17B are provided for the lasers 12A and 12B, respectively, and the formation of an electrostatic latent image on the photosensitive drum 3 is performed by controlling the amount of light of each of the lasers 12A and 12B. A BD sensor 16 for converting light output into an electric signal is provided at a portion outside of a position to start beam scanning. The BD sensor 16 operates as a synchronizing mechanism for determining a timing to write image information on the photosensitive drum 3 by detecting the timing of passage of the light beam. Usually, the BD sensor 16 is disposed at a position outside of the scanning region so as to obtain the timing of emission of the light beam at every scanning operation. A write signal is transmitted after the lapse of a predetermined time of t seconds after the BD sensor 16 has detected the scanning beam, and image data is formed with a predetermined video clock frequency.

The lasers 12A and 12B are mounted and the lens systems are adjusted so that the interval between light spots A and B formed on the scanning surface of the photosensitive drum 3 by light beams emitted from the lasers 12A and 12B, respectively, has a predetermined value. The distance between the light spots A and B in the main scanning direction is determined so that the timing of passage of each of the light spots can be independently detected, and the distance between the light spots in the sub-scanning direction is determined based on the resolution of the electrostatic latent image.

Next, the electric system of the image forming apparatus will be described with reference to FIG. 15.

Figure 15:
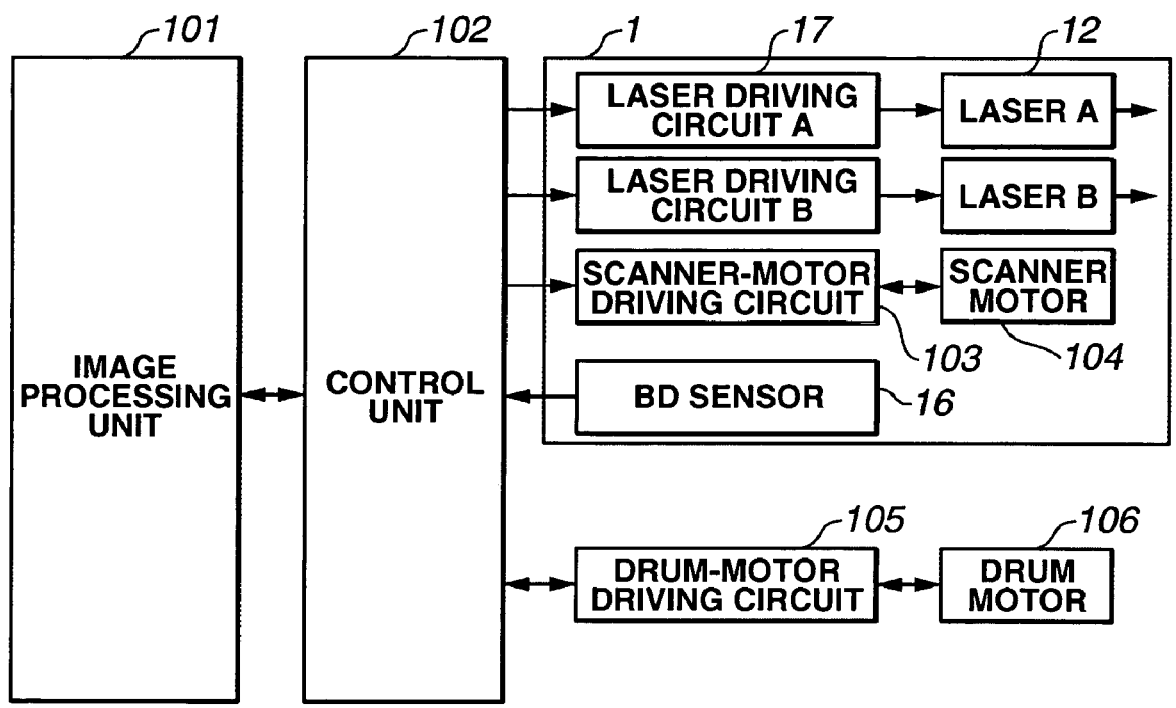
FIG. 15 is a diagram illustrating the electric system of the image forming apparatus shown in FIG. 1.

In FIG. 15, an image processing unit 101 generates image data to be formed by the image forming apparatus by receiving a printing job from a host computer (not shown). A control unit 102 controls overall image forming operations of the image forming apparatus. The scanner unit 11 includes the laser driving circuit 17, the laser 12 and the BD sensor 16 that have been described above, as well as a scanner motor 104 for rotating the polygonal mirror 14, a scanner-motor driving circuit 103 for driving the scanner motor 104, and the like. A control unit 102 detects the rotational speed of the scanner motor 104 based on the interval between BD signals transmitted from the BD sensor 16, and transmits a control signal to the scanner-motor driving circuit 103 so that the revolution speed of the scanner motor 104 has a predetermined value. The control unit 102 also controls the timing of transmission of image data so that modulation by the laser driving circuit 17 is started after a predetermined time from a BD signal from the BD sensor 16. By variably controlling the timing from the BD signal to transmission of image data, it is possible to shift the formed line in the main scanning direction.

A drum motor 106 rotates the photosensitive drum 3, and a drum-motor driving circuit 105 drives the drum motor 106. The control unit 102 instructs a target speed to the drum-motor driving circuit 105. In the first embodiment, as will be described later, by switching the target speed for the scanner motor 104 or the drum motor 106 to one of a plurality of values by the control unit 102, a plurality of resolution modes can be switched.

Figure 4:
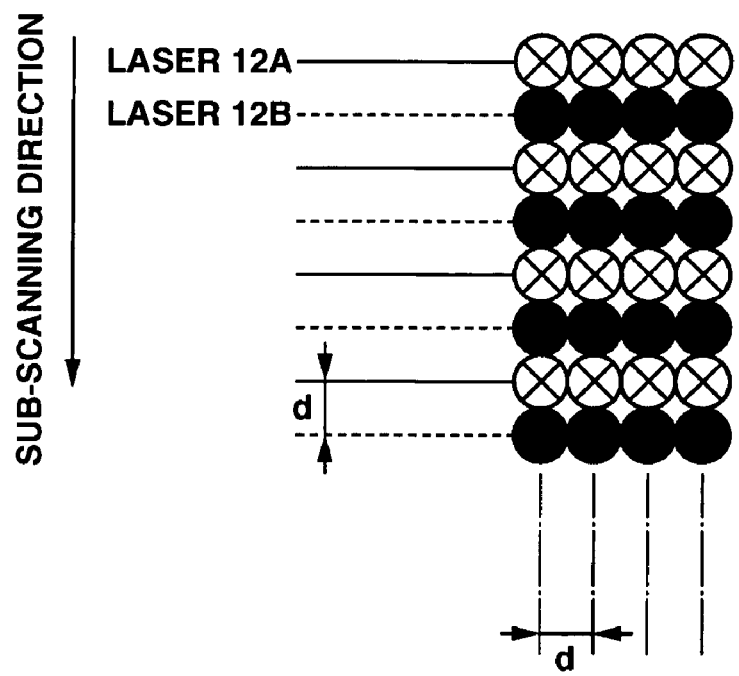
FIG. 4 is a diagram illustrating an ordinary-resolution mode in the first embodiment.

According to the above-described configuration, in an ordinary-resolution mode, as shown in FIG. 4, an image for two lines, i.e., a dot line by the laser 12A and a dot line by the laser 12B, is simultaneously formed at one scanning operation with a dot interval d in the main scanning direction and in the sub-scanning direction.

Next, the case of a high-resolution mode in which resolution is doubled both in the main scanning direction and the sub-scanning direction.

Figure 5:
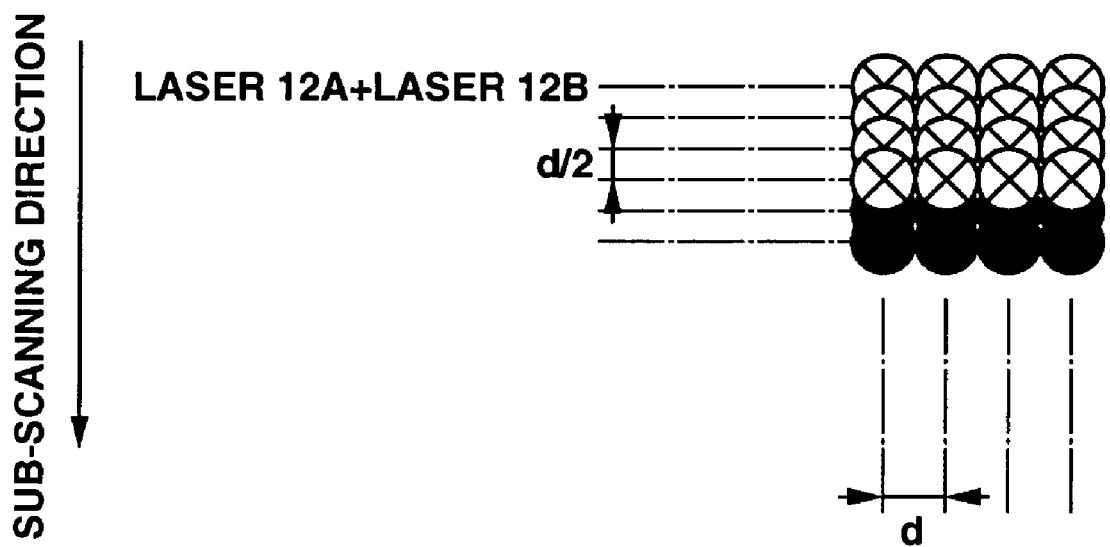
FIG. 5 is a diagram illustrating a high-resolution mode in the first embodiment.
Figure 6:
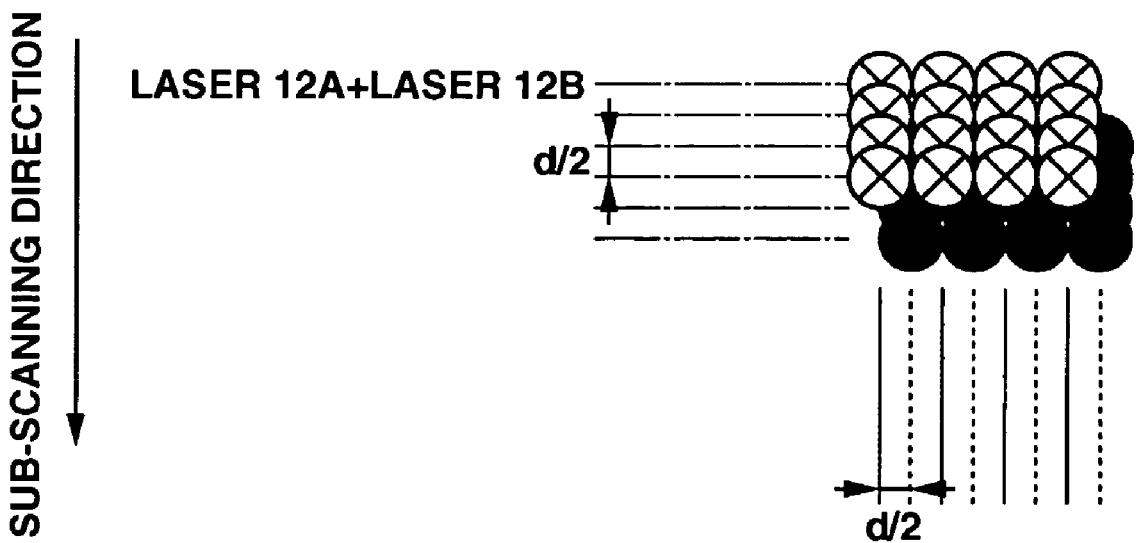
FIG. 6 is a diagram illustrating a high-resolution mode in the first embodiment.

In a two-beam laser system, in order to double the resolution in the sub-scanning direction, the scanning period for the photosensitive drum must be reduced to ¼. Hence, the rotational speed of the polygonal mirror is increased by four times while increasing the video clock frequency by four times. When the scanning period is reduced to ¼, duplicated scanning as shown in FIG. 5 is performed. Accordingly, in contrast to the conventional approach in which scanning is performed only by one of the lasers 12A and 12B, scanning is performed by the two lasers 12A and 12B in the first embodiment. At that time, when a write signal for the laser 12A is transmitted after the lapse of a predetermined time of t seconds after the BD sensor has detected a scanning beam, a write signal for the laser 12B is arranged to be transmitted after (t+t2) seconds, where the time t2 is a time delay in order to adjust a dot of the dot string by the laser 12B to be positioned just between dots of the dot string by the laser 12A. Usually, the time delay t2 is set to be shifted by d/2 with respect to the dot interval d in the ordinary-resolution mode. According to the above-described setting, as shown in FIG. 6, dots by the laser 12A and dots by the laser 12B are alternately printed with an interval of d/2. As a result, even if the resolution in the sub-scanning direction is doubled, dot formation is performed without performing duplicated scanning. The resolution in the main scanning direction is also doubled. This is a first high-resolution mode in the first embodiment.

Figure 7:
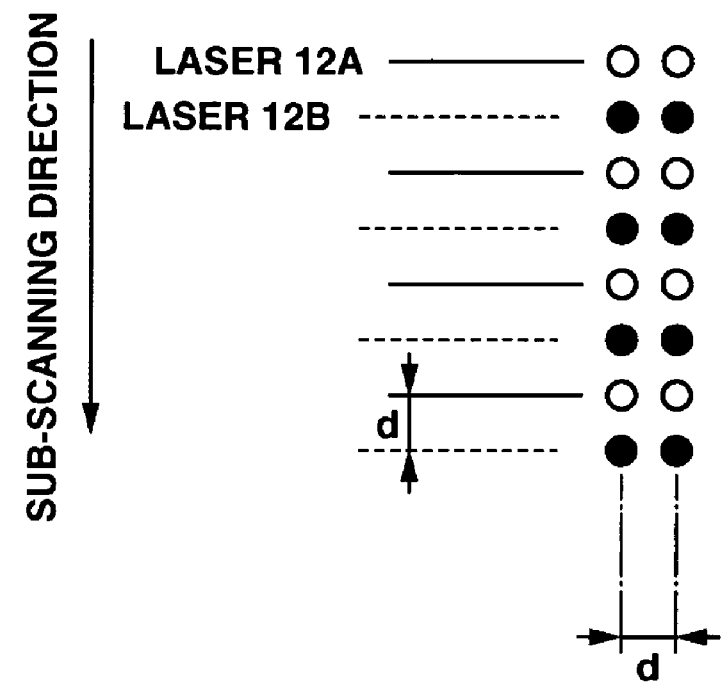
FIG. 7 is a diagram illustrating an ordinary-resolution mode in the first embodiment.
Figure 8:
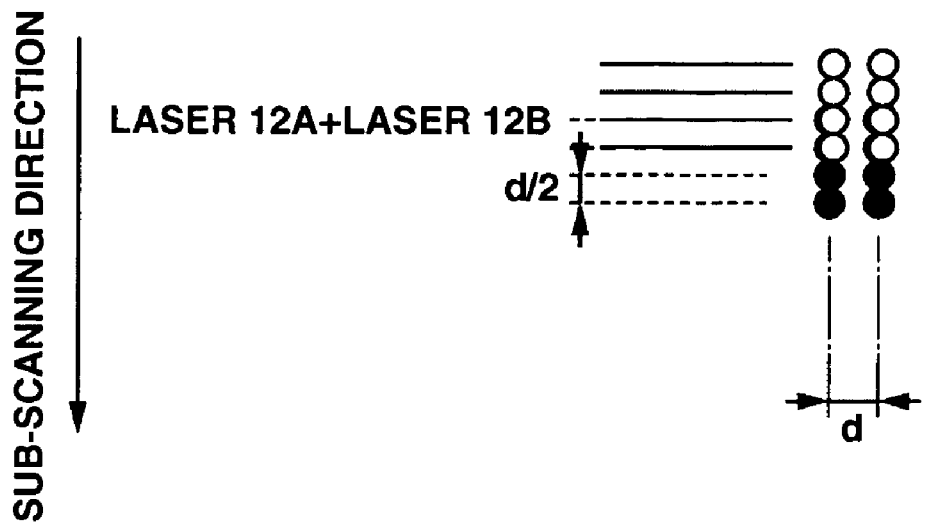
FIG. 8 is a diagram illustrating a high-resolution mode in the first embodiment.
Figure 9:
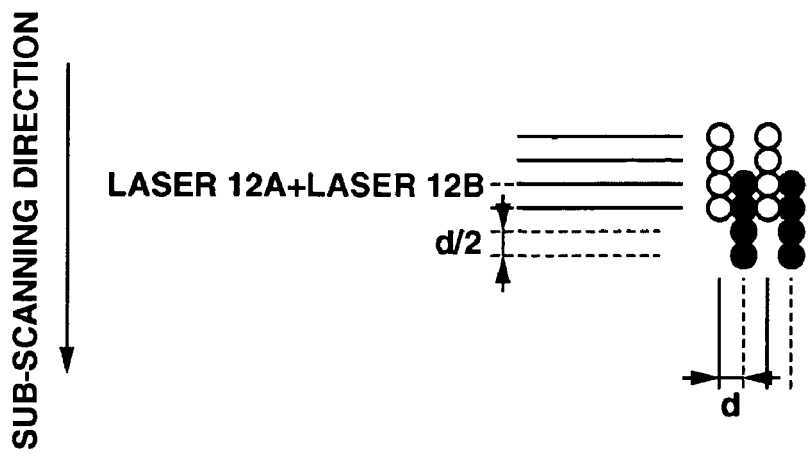
FIG. 9 is a diagram illustrating a high-resolution mode in the first embodiment.

Although FIGS. 4, 5 and 6 illustrate a case in which the dot diameter remains d, FIGS. 7, 8 and 9 illustrate a case in which the dot diameter is set to d/2. FIG. 7 illustrates a case in which the dot diameter is set to d/2 in the ordinary-resolution mode, and FIG. 8 illustrates a case in which the scanning period is reduced to ¼ in this state. Since the interval between the lasers 12A and 12B remains d even when the scanning period is reduced to ¼, duplicated scanning as shown in FIG. 8 is performed. FIG. 9 illustrates a second high-resolution mode in the first embodiment. In the case of FIG. 9, by providing a time difference of t2 in the main scanning direction between write signals for the lasers 12A and 12B, the dot strings of the two lasers are arranged to be shifted by d/2 in the main scanning direction. As can be understood from FIG. 9, the resolution is doubled both in the main scanning direction and in the sub-scanning direction, and duplicated scanning can be prevented.

As described above, in order to double the resolution in the main scanning direction and the sub-scanning direction, the scanning frequency (the number of scanning operations per unit length in the sub-scanning direction) for the photosensitive drum may be increased by four times. In order to increase the scanning frequency for the photosensitive drum by four times, in addition to the above-described method of reducing the scanning period to ¼ compared with the case of the ordinary-resolution mode while not changing the rotational speed of the photosensitive drum, a method of reducing the rotational speed of the photosensitive drum to ¼ while not changing the scanning period may also be adopted. According to this method, it is possible to provide high resolution in the main scanning direction and in the sub-scanning direction without increasing the video clock frequency, and suppress an increase in radiation noise.

Although in the foregoing description, a photosensitive drum has been illustrated as the photosensitive member, the same effect may, of course, be obtained when a photosensitive belt is used as the photosensitive member.

(Second Embodiment)

In the first embodiment, it has been shown that, when intending to increase resolution in the sub-scanning direction in a two-beam laser system, it is possible to prevent duplicated scanning by changing the writing position by one of two lasers, and also provide high resolution in the main scanning direction. However, in order to provide high resolution only in the main scanning direction, the scanning period for the photosensitive drum need not be reduced to ¼, but it is only necessary to reduce the scanning period to ½. This case will be described as a second embodiment of the present invention. The configuration and the operations of hardware in the second embodiment are the same as in the first embodiment except for a scanner unit. Hence, the description in the first embodiment will also be used.

Figure 10:
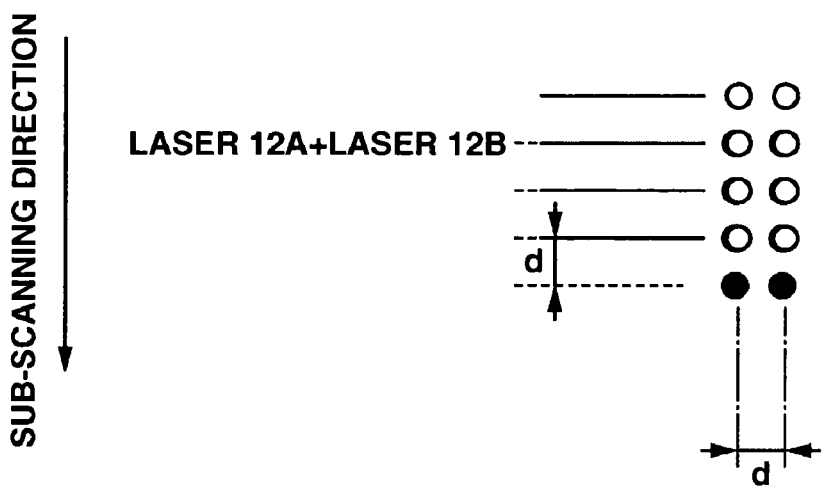
FIG. 10 is a diagram illustrating a high-resolution mode in a second embodiment of the present invention.
Figure 11:
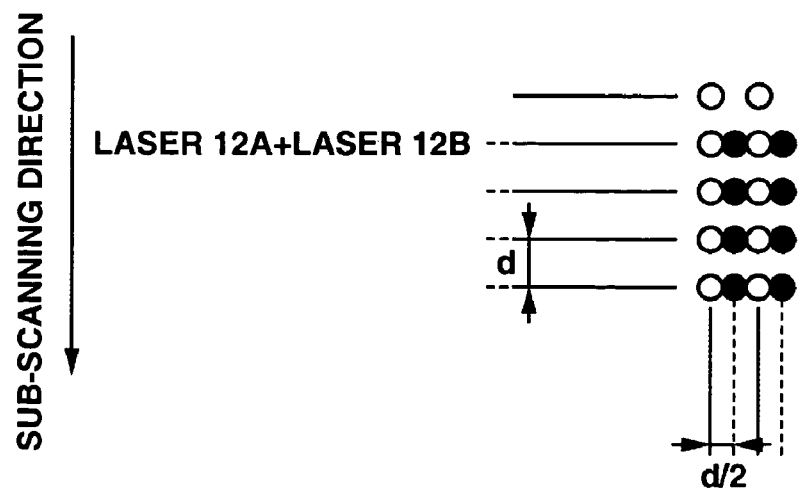
FIG. 11 is a diagram illustrating a high-resolution mode in the second embodiment.

FIG. 10 illustrates a state in which, in a two-beam laser system (see FIG. 4), the dot diameter is reduced to d/2, and the scanning period for the photosensitive drum is reduced to ½. In this state, duplicated scanning by the lasers 12A and 12B is performed. At that time, when a write signal for the laser 12A is transmitted after the lapse of a predetermined time of t seconds after the BD sensor has detected a scanning beam, a write signal for the laser 12B is arranged to be transmitted after (t+t2) seconds, where the time t2 is a time delay in order to adjust a dot of the dot string by the laser 12B to be positioned just between dots of the dot string by the laser 12A. Usually, the time delay t2 is set to be shifted by d/2 with respect to the dot interval d in the ordinary-resolution mode. Then, as shown in FIG. 11, the resolution in the main scanning direction can be doubled.

As described above, in order to double the resolution in the main scanning direction and the sub-scanning direction, the scanning frequency (the number of scanning operations per unit length in the sub-scanning direction) for the photosensitive drum may be doubled. In order to double the scanning frequency for the photosensitive drum, in addition to the above-described method of reducing the scanning period to ½ compared with the case of the ordinary-resolution mode while not changing the rotational speed of the photosensitive drum, a method of reducing the rotational speed of the photosensitive drum to ½ while not changing the scanning period may also be adopted. According to this method, it is possible to provide high resolution in the main scanning direction and in the sub-scanning direction without increasing the video clock frequency, and suppress an increase in radiation noise.

Although the case of a two-beam laser system has been described, the same effects may also be obtained in the case of a multibeam laser system using beams larger than two beams, such as a three-beam laser system, a four-beam laser system, or the like. That is, when the problem of duplicated scanning arises by increasing the scanning frequency for the photosensitive drum in order to provide high resolution in the sub-scanning direction, it is possible to provide high resolution in the main scanning direction, by arranging dots to be formed at an equal interval in the main scanning direction by shifting the write time after detection of each laser by the BD sensor. When the dot interval at the ordinary resolution mode is represented by d, and the number of laser beams is represented by n (n is a natural number equal to or larger than 2), n dot strings are formed at one scanning operation in the ordinary-resolution mode. If the scanning period is set to a small value of 1/n, duplicated scanning by n lines is performed at one scanning operation. At that time, the writing positions by respective laser beams are changed so as to be shifted by d/n. Then, a dot string having a dot interval of d/n is formed in the main scanning direction, and the resolution in the main scanning direction is increased by n times.

(Third Embodiment)

The case of a four-beam laser system will now be described as a third embodiment of the present invention. The configuration and the operations of hardware in the third embodiment are the same as in the first embodiment except for a scanner unit. Hence, the description in the first embodiment will also be used.

Figure 12:
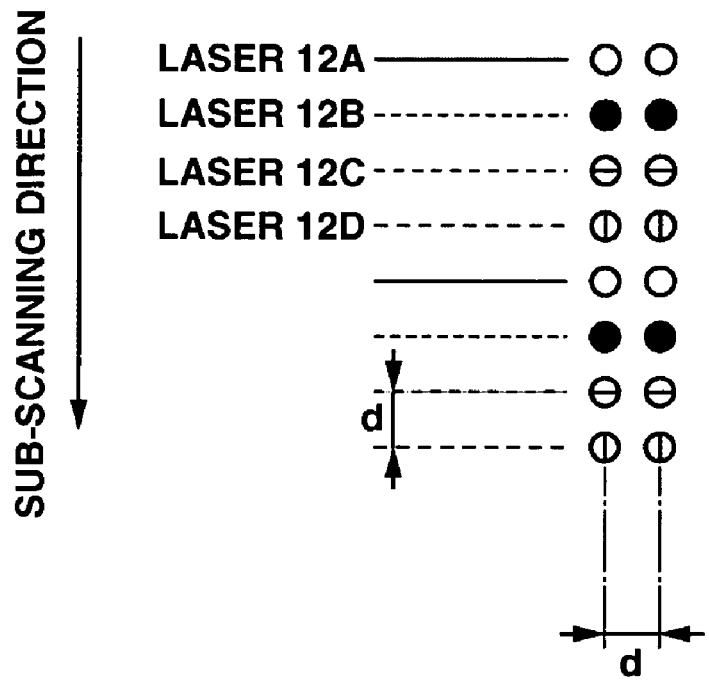
FIG. 12 is a diagram illustrating an ordinary-resolution mode in a third embodiment of the present invention.
Figure 13:
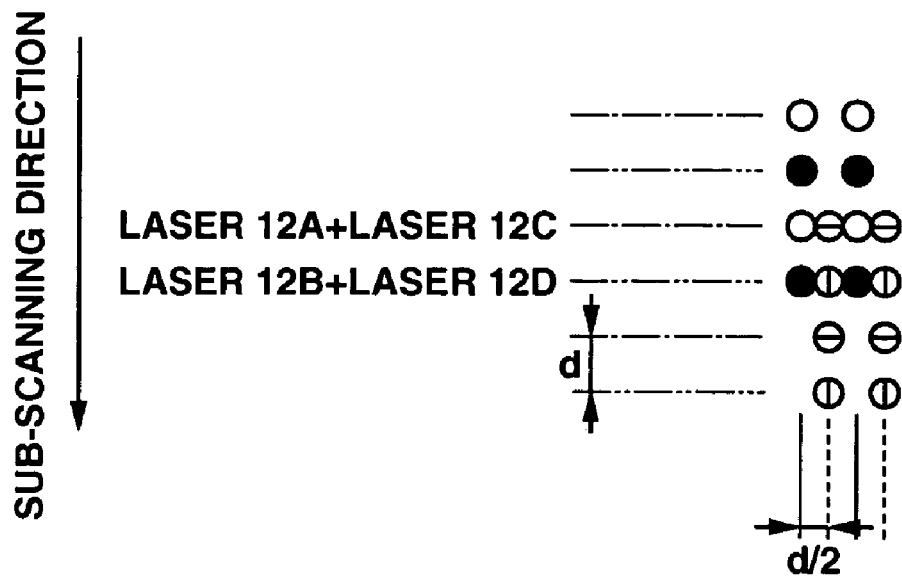
FIG. 13 is a diagram illustrating a high-resolution mode in the third embodiment.

When the number n (n is a natural number equal to or larger than 2) of laser beams can be subjected to factorization into prime numbers, duplicated scanning is performed if the scanning period is set to 1/(a prime factor of n) even though the scanning period is not reduced to 1/n. FIG. 12 illustrates dot strings in a four-beam laser system. Four dot strings can be formed at one scanning operation by lasers 12A, 12B, 12C and 12D. In the four-beam laser system, when the scanning period is reduced to ½, i.e., the scanning frequency is doubled (as described above, in order to double the scanning frequency, the scanning period is reduced to ½ compared with the case of the ordinary-resolution mode without changing the rotational speed of the photosensitive drum, or the rotational speed of the photosensitive drum is reduced to ½ without changing the scanning period), the lasers 12A and 12C, and the lasers 12B and 12D perform duplicated scanning. Accordingly, the writing positions by the respective lasers are shifted by d/2. Then, as shown in FIG. 13, dot strings having a dot interval of d/2 are formed, and the resolution in the main scanning direction is doubled.

Figure 14:
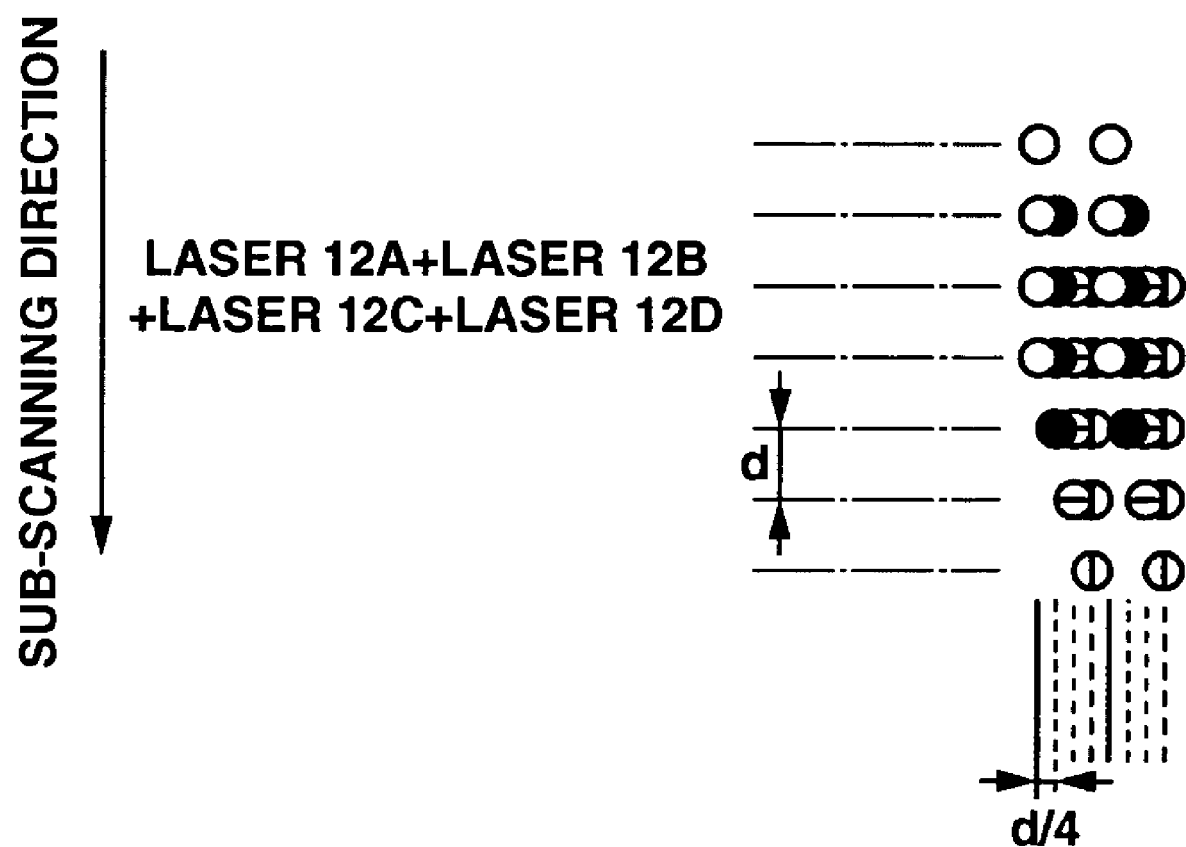
FIG. 14 is a diagram illustrating a high-resolution mode in the third embodiment.

FIG. 14 illustrates a case in which the scanning frequency is increased by four times in a four-beam laser system. In the case of FIG. 14, writing position by respective lasers are shifted by d/4. Then, dot strings having a dot interval of d/4 are formed, and the resolution in the main scanning direction is increased by four times.

In this four-time mode, the main-scanning period may be increased by four times, or the rotational speed of the photosensitive drum may be reduced to ¼. Alternatively, the main-scanning period may be doubled and the rotational speed of the photosensitive drum may be reduced to ½. By thus controlling the main-scanning period and/or the rotational speed of the photosensitive drum, four-time resolution is achieved.

To sum up, when the following relationship holds for the number of laser beams:

$$n = i1 \times k1 = i2 \times k2 = i3 \times k3 \text{ - - -},$$

where i1, i2, i3 - - - : natural numbers
k1, k2, k3 - - - different natural numbers, a first high-resolution mode in which k=k1, a second high-resolution mode in which k=k2, a third high-resolution mode in which k=k3 - - - can be switched from each other.

Since an ordinary mode that is not a high-resolution mode is provided at k=1, at least two modes are provided with the condition of k>1.

That is, when the number of lasers can be subjected to factorization into prime factors, a plurality of modes of at least two can be selected as high-resolution modes.

As described above, it is possible to increase the resolution in the main scanning direction and in the sub-scanning direction by utilizing features of the multibeam method.

The individual components shown in outline or designated by blocks in the drawings are all well known in the image forming apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

n independently driven light sources;

a scanner unit that causes n light beams from said n light sources to perform scanning on a photosensitive member in a main scanning direction;

a moving unit that causes the n light beams to perform scanning on said photosensitive member in a sub-scanning direction by moving said photosensitive member;

a controller that controls said scanner unit and/or said moving unit so that a main scanning line on the photosensitive member is subjected to overlap exposure k times by different light beams, said controller having at least a first mode in which k is set to k1, and a second mode in which k is set to k2 ($\neq$k1), wherein n=i1×k1 =i2×k2 i1 and i2 are natural numbers, and k1 and k2 are natural numbers equal to or larger than 2; and a modulator that modulates the respective light beams so that dot strings formed by the light beams are shifted by a distance of d/k in the main scanning direction, where d is an interval between dots formed by one light beam.

2. An image forming apparatus according to claim 1, further comprising a beam detector that detects a light beam caused to perform scanning by said scanner unit, wherein said modulator modulates the respective light beams so that the dot strings formed by the light beams are shifted by the distance of d/k in the main scanning direction, based on a detection signal from said beam detector.

3. An image forming apparatus according to claim 1, wherein said apparatus variably controls a dot system by the light beam.

4. An image forming apparatus according to claim 1, wherein the light beam is a laser beam.

* * * * *

UNITED STATES PATENT AND TRADEMARK OFFICE
CERTIFICATE OF CORRECTION

PATENT NO. : 7,129,966 B2 Page 1 of 1
APPLICATION NO. : 10/754530
DATED : October 31, 2006
INVENTOR(S) : Takaaki Tsuruya It is certified that error appears in the above-identified patent and that said Letters Patent is hereby corrected as shown below:

COLUMN 2:
Line 41, "(=k1)," should read -- ($\neq$k1), -- and "n=i1×k1$\neq$i2×k2," should read -- n=i1×k1=i2×k2, --.

COLUMN 9:
Line 13, "overlap" should read -- overlapped --; and
Line 17, "n=i1×k1=i2×k2" should read -- n=i1×k1=i2×k2, --.

Signed and Sealed this

First Day of May, 2007

JON W. DUDAS
*Director of the United States Patent and Trademark Office*